United States Patent
Currie et al.

[19]

[11] Patent Number: 5,882,457
[45] Date of Patent: Mar. 16, 1999

[54] TIRE TREAD GUIDING

[75] Inventors: William Dudley Currie, Stow; Daniel Ray Downing, Uniontown; James Michael Hart, Akron; Lori Ann Kefalos, Barberton, all of Ohio; Luc Minsart, Bastogne, Belgium; Jean Alex Reichling, Colmar-Berg, Luxembourg

[73] Assignee: The Goodyear Tire & Rubber Company, Akron, Ohio

[21] Appl. No.: 847,322

[22] Filed: Apr. 23, 1997

Related U.S. Application Data

[62] Division of Ser. No. 563,363, Nov. 28, 1995, abandoned.

[51] Int. Cl.⁶ ..................................................... B29D 30/30
[52] U.S. Cl. .................. 156/130; 156/128.1; 156/405.1; 226/3; 226/17
[58] Field of Search ................................ 156/123, 128.1, 156/128.6, 130, 405.1, 406.4; 226/3, 19, 17, 192, 196.1; 198/636, 782, 785, 786, 385

[56] References Cited

U.S. PATENT DOCUMENTS

| | | | |
|---|---|---|---|
| 1,419,064 | 6/1922 | Landon . | |
| 2,346,439 | 4/1944 | Leguillon | 156/408 |
| 3,052,395 | 9/1962 | Scott | 226/19 |
| 3,139,963 | 7/1964 | Nädler et al. | 226/19 |
| 3,393,112 | 7/1968 | Brown | 156/405 |
| 3,847,705 | 11/1974 | Habert et al. | 156/405 |
| 4,049,486 | 9/1977 | Henley | 156/405.1 |
| 4,304,619 | 12/1981 | Riggs | 156/126 |
| 4,470,865 | 9/1984 | Egan et al. | 156/395 |
| 4,747,904 | 5/1988 | Okuyama et al. | 156/408 |
| 4,867,434 | 9/1989 | Okuyama et al. | 271/42 |
| 4,874,443 | 10/1989 | Kipling | 156/64 |
| 5,194,107 | 3/1993 | Okuyama et al. | 156/64 |
| 5,292,398 | 3/1994 | Miyamoto et al. | 156/405.1 |
| 5,415,217 | 5/1995 | Okuyama et al. | 156/406.6 |
| 5,427,636 | 6/1995 | Chabin et al. | 156/406.6 |
| 5,534,093 | 7/1996 | Marks et al. | 156/406.6 |

FOREIGN PATENT DOCUMENTS

| | | | |
|---|---|---|---|
| 164709 | 12/1985 | European Pat. Off. | 156/128.1 |
| 05152277A2 | 11/1992 | European Pat. Off. . | |
| 0671255A1 | 9/1995 | European Pat. Off. . | |
| 4108515A1 | 9/1991 | Germany . | |
| 880783 | 11/1981 | U.S.S.R. . | |

*Primary Examiner*—Geoffrey L. Knable
*Attorney, Agent, or Firm*—Frederick K Lacher

[57] ABSTRACT

Tire building apparatus and method wherein the cut to length tread is transported to a drum on a conveyor having laterally movable driving rollers and inverted guide rollers engaging the inner surfaces of raised shoulders of the tread. Control of the tread length is provided by measuring the length of the tread before and while it is being wrapped on the drum and then varying the stretching and rate of tread application to the drum to provide a precise splice of the ends of the tread. The position of the tread ends are controlled by a pricker bar to insure placement of the leading end on the drum and then placement of the trailing end on the drum over the leading end to provide the desired splice.

3 Claims, 10 Drawing Sheets

TIRE TREAD GUIDING

This application is a division of application Ser. No. 08/563,363 filed Nov. 28, 1995 now abandoned.

BACKGROUND OF THE INVENTION

This invention relates to a tread server for applying a tire tread to a drum and splicing the tread accurately without the need of an operator. In addition, the tread is centered without distorting the edges.

Heretofore, treads have been measured once and the drum speed of rotation varied to compensate for variations between the tread length and the circumference of the drum. There have not been additional measurements during the conveying process to compensate for changes in length during the guiding and conveying of the tread. There have also been no positive guiding and positioning of the leading end and trailing end to provide a precision splice of the tread on the drum. Guide rollers have been used to center the tread, however no provision has been made for preventing distortion of the edges of wide, thin treads or soft compound treads.

SUMMARY OF THE INVENTION

The present invention provides for measuring the length of the tread while on the conveyor and before it is wrapped on the drum. Then the length is measured a second time after the tread is partially wrapped on the drum. Each time the ratio between the length of the tread and the circumference of the drum is obtained and the resulting ratio between the speed of rotation of the drum and the conveyor speed of the trailing edge of the tread is utilized to carry the trailing edge to a position on the drum where the leading edge is located for accurately splicing the ends of the tread. In this way the stretching of the tread is controlled. In fact, for certain tires the tread may be stretched different amounts where desired by utilizing the concept of this invention. In addition to controlling the stretching of the tread the ends are controlled by a pricker bar which carries the leading edge to a predetermined splice position on the drum and then is utilized to carry the trailing edge to the predetermined splice position.

Guiding of the tread in accordance with a modification of this invention is provided by guide rolls tilted to engage the inner side edges of the tread shoulders to avoid distorting the tread side edges.

In accordance with one aspect of the invention, there is provided a tire comprising a tire carcass having a pair of spaced apart beads connected by reinforcing plies, a belt member extending circumferentially around the tire carcass and a tread member wrapped around the belt member, the tread member including a length of elastomeric material extruded to a predetermined cross-sectional tread shape and cut to a predetermined initial length with the tread member being formed by application to the belt member on a rotatable drum from a conveyor positioned with a discharge end adjacent the drum; the tread application being at a first rate of application calculated from the ratio of the initial length of the tread to the circumference of the drum and then at a second rate of application calculated from the ratio of an intermediate length of the tread measured after a predetermined application of the tread to the circumference of the drum providing a precise splice of the rear edge to the front edge of the tread.

In accordance with another aspect of the invention, there is provided a method of making a tire comprising building a tire carcass on a first tire building drum, forming a belt member and tire tread assembly by applying a belt member to a second drum, stretching and applying a tire tread to the belt member on the second drum from a conveyor adjacent the second drum including the steps of:

a. feeding a tire tread onto the conveyor until a leading edge of the tire tread is detected by a first sensor at a first position of the tire tread.

b. gripping the tire tread at the leading edge with a gripper connected to a conveyor encoder.

c. continuing to move the tread along the conveyor until a trailing edge of the tire tread is detected by a second sensor at a second position of the tire tread.

d. calculating the length of the tire tread by adding the known distance between the first sensor and the second sensor to the distance moved by the gripper as calculated by the conveyor encoder and, e. calculating a first ratio between the circumference of the drum as measured by a drum encoder and the length of the tire tread as calculated by the conveyor encoder for determining the required speeds of the drum and conveyor to stretch and wrap the tire tread on the second drum, f. removing the gripper;

g. applying the leading edge of the tire tread to the second drum;

h. rotating the second drum and driving the conveyor at the calculated speed until the trailing edge of the tire tread is detected by a third sensor positioned adjacent the conveyor between the first sensor and the second sensor to measure the length of the tread in a third position;

i. moving the gripper to a position over the trailing edge and gripping the trailing edge;

j. calculating a second ratio between the drum encoder count for length of the drum not wrapped by the tread and the conveyor encoder count for the distance between the third sensor and the end of the conveyor;

k. rotating the drum while operating the conveyor and moving the gripper at speeds determined in accordance with the second ratio to stretch the tire tread so that the leading edge and the trailing edge will be joined on the drum for splicing;

l. removing the gripper from the trailing edge after splicing;

m. transferring the belt member and tire tread assembly to the first drum for application to the tire carcass;

n. transferring the tire with the belt member and tread assembly from the first drum to a tire press for curing under pressure at a predetermined temperature; and o. removing the cured tire from the tire press.

In accordance with still another aspect of the invention, there is provided an apparatus for wrapping and controlling the stretching of an extruded tread member of elastomeric material cut to an initial length around a belt member on a drum to provide for splicing a leading edge and a trailing edge of the tread member on the drum comprising:

a. a generally horizontal conveyor positioned with a discharge end adjacent the drum;

b. driving rollers on the conveyor for carrying the tread member;

c. a tread gripper disposed above and movable along the conveyor for gripping the tread member;

d. a first sensor disposed adjacent an entry end of the conveyor for detecting the location of the leading edge of the tread member in a first position of the tread member;

e. a second sensor disposed adjacent the discharge end of the conveyor for detecting the location of a trailing edge of the tread in a second position of the tread member;

f. a third sensor disposed adjacent the conveyor between the first sensor and the second sensor for detecting the location of the trailing edge of the tread member in a third position of the tread;

g. a conveyor encoder for measuring the distance the tread member and the gripper are moved on the conveyor;

h. a drum encoder for measuring the distance the tread member is moved on the drum; and i. the sensors being operatively connected to the drum encoder and the conveyor encoder to control the relative speeds of the drum and the conveyor in response to signals from the first sensor the second sensor, the third sensor and by the conveyor encoder and drum encoder to provide for stretching the tread member and joining the leading edge and the trailing edge in a splice of the tread member at a predetermined position on the drum.

In accordance with a further aspect of the invention, there is provided a method of stretching and applying a tire tread to a rotatable drum from a conveyor adjacent the drum including the steps of:

a. feeding the tire tread onto a conveyor until a leading edge of the tire tread is detected by a first sensor at a first position of the tire tread.

b. gripping the tire tread at the leading edge with a gripper connected to a conveyor encoder;

c. continuing to move the tread along the conveyor until a trailing edge of the tire tread is detected by a second sensor at a second position of the tire tread;

d. calculating the length of the tire tread by adding the known distance between the first sensor and the second sensor to the distance moved by the gripper as calculated by the conveyor encoder;

e. calculating a first ratio between the circumference of the drum as measured by a drum encoder and the length of the tire tread as calculated by the conveyor encoder for determining the required speeds of the drum and conveyor to stretch and wrap the tire tread on the second drum;

f. removing the gripper;

g. applying a leading edge of the tire tread to the drum;

h. rotating the drum and driving the conveyor at the required speeds until the trailing edge of the tire tread is detected by a third sensor positioned adjacent the conveyor between the first sensor and the second sensor to measure the length of the tread in a third position, i. moving the gripper to a position over the trailing edge and gripping the trailing edge;

j. calculating a second ratio between the drum encoder count for the length of the drum not wrapped by the tread and the conveyor encoder count for the distance between the third sensor and the end of the conveyor;

k. rotating the drum while operating the conveyor and moving the gripper at different speeds determined in accordance with the second ratio to stretch the tire tread so that the leading edge and the trailing edge will be joined on the drum for splicing and;

l. removing the gripper from the trailing edge after splicing.

In accordance with a still further aspect of the invention, there is provided an apparatus for transporting a tire tread on a conveyor having a plurality of driven rollers for supporting the tread, the driven rollers being moveable laterally to permit lateral guiding of the tread and guide rollers at each side of the conveyor engageable with the tread to provide the lateral guiding.

To acquaint person skilled in the arts most closely related to the present invention certain preferred embodiments thereof illustrating the best made now contemplated for putting the invention into practice are described herein, by and with reference to the annexed drawings forming a part of the specification. The embodiments shown and described herein are illustrative and will become apparent to those skilled in these arts and can be modified in numerous ways within the spirit and scope of the invention as defined in the claims hereof.

DETAILED DESCRIPTION OF THE INVENTION

Figure 1:
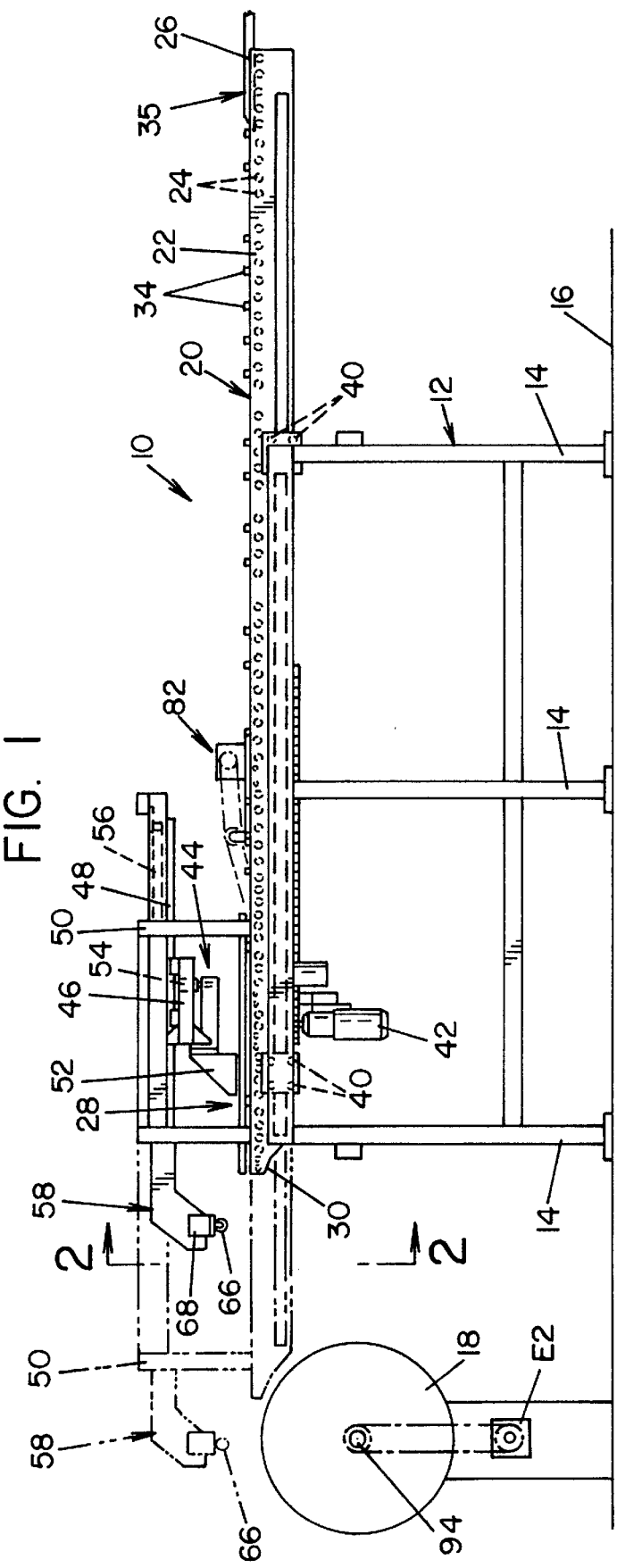
FIG. 1 is a side elevation of the tread applier shown with the tread server in the retracted position.
Figure 2:
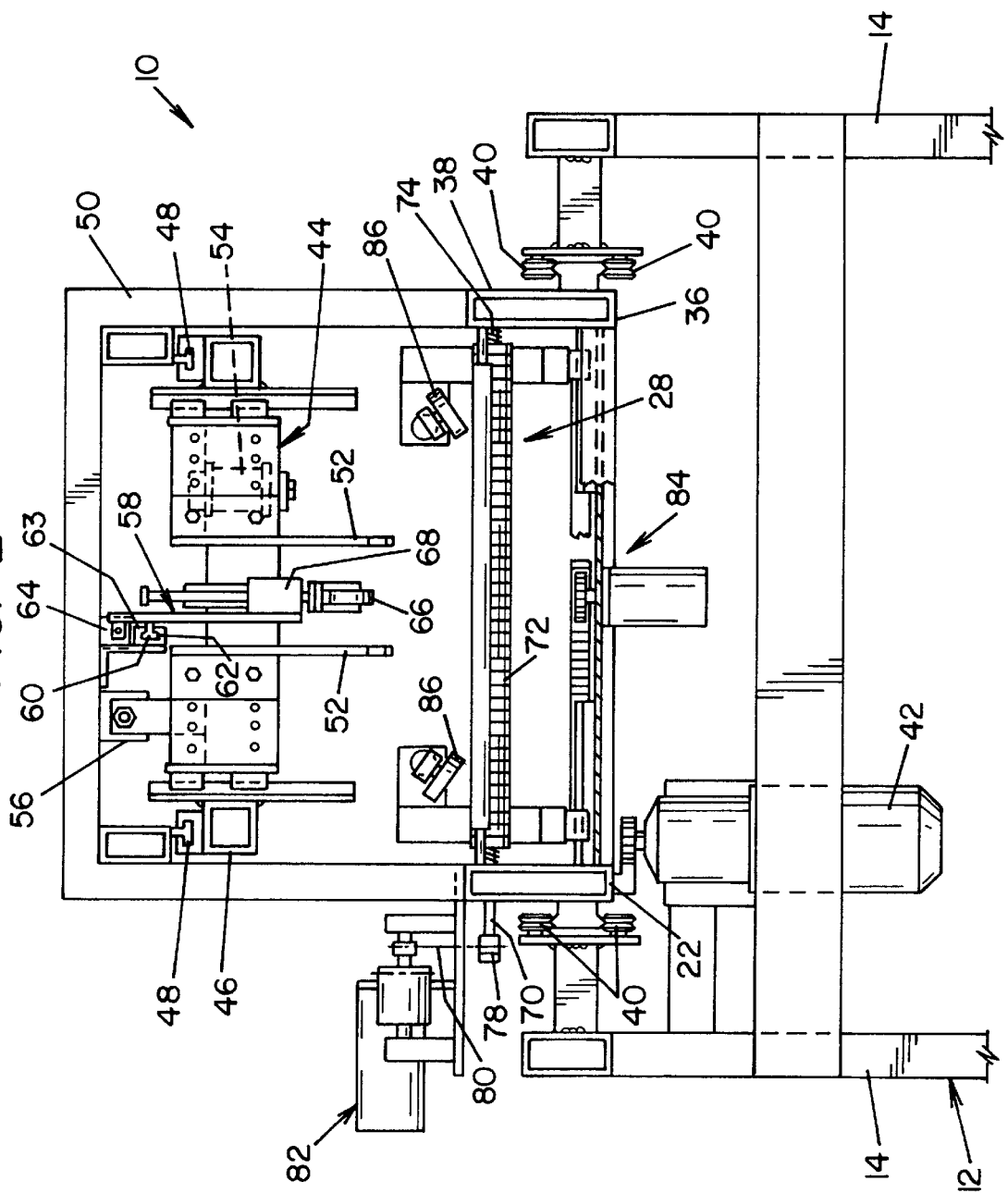
FIG. 2 is a front elevation partially in section taken along the line 2—2 in FIG. 1.

A tread server 10 embodying the invention is shown in FIGS. 1 and 2 and has a frame 12 with legs 14 for supporting engagement with a floor 16 at a position adjacent a tire tread and belt building drum 18. The frame 12 supports a tread conveyor 20 having side beams 22 supporting transverse rollers 24 at an entrance end 26 and a tread server assembly 28 at an exit end 30. A guide fence 32 having vertical guide rollers 34 mounted on transversely adjustable fence bars is provided to guide a tread 35 along the conveyor 20 which may be fed automatically or by hand into the entrance end 26 of the conveyor.

The tread server assembly 28 has a frame 36 with side rails 38 supported on spaced apart side wheels 40 mounted on the frame 12. Suitable power means such as a motor 42 may be provided for moving the tread server assembly 28 from the retractable position shown in full lines in FIG. 1 to the extended position shown in dot dash lines close to the belt and tread drum 18.

Mounted above the tread server assembly 28 is a pricker bar assembly 44 having a pricker bar frame 46 supported on rails 48 on an upper frame structure 50. Pricker bars 52 are mounted on the bar frame 46 for movement vertically into engagement with the tread 35 by suitable lifting and lowering means 54. Horizontal movement of the pricker bar assembly 44 is also provided by suitable ball-screw and motor assembly 56.

A tack down roller assembly 58 is also slidably mounted on the upper frame structure 50. A rail 60 on the roller assembly 58 is slidably mounted in a groove 62 of a slider bar 63 carried by the frame structure 50. Suitable means for moving the tack down roller assembly 58 horizontally toward and away from the drum 18 is provided such as piston cylinder assembly 64. A tack down roller 66 is mounted on a roller piston cylinder assembly 68 attached to the end of the tack down roller assembly 58 for moving the roller vertically into engagement with the tread 35.

Figure 3:
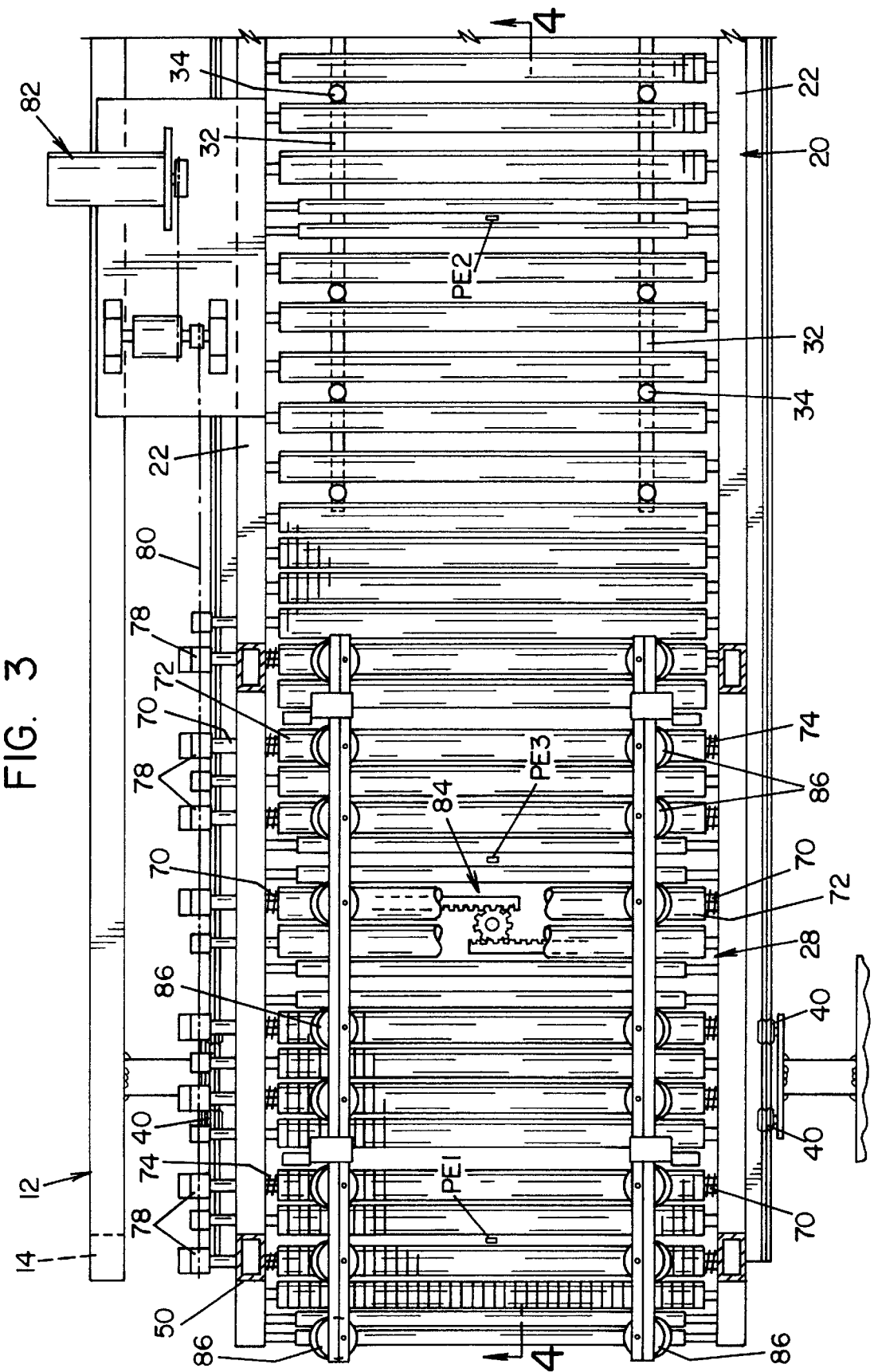
FIG. 3 is an enlarged plan view of the tread server shown in FIGS. 1 and 2.
Figure 4:
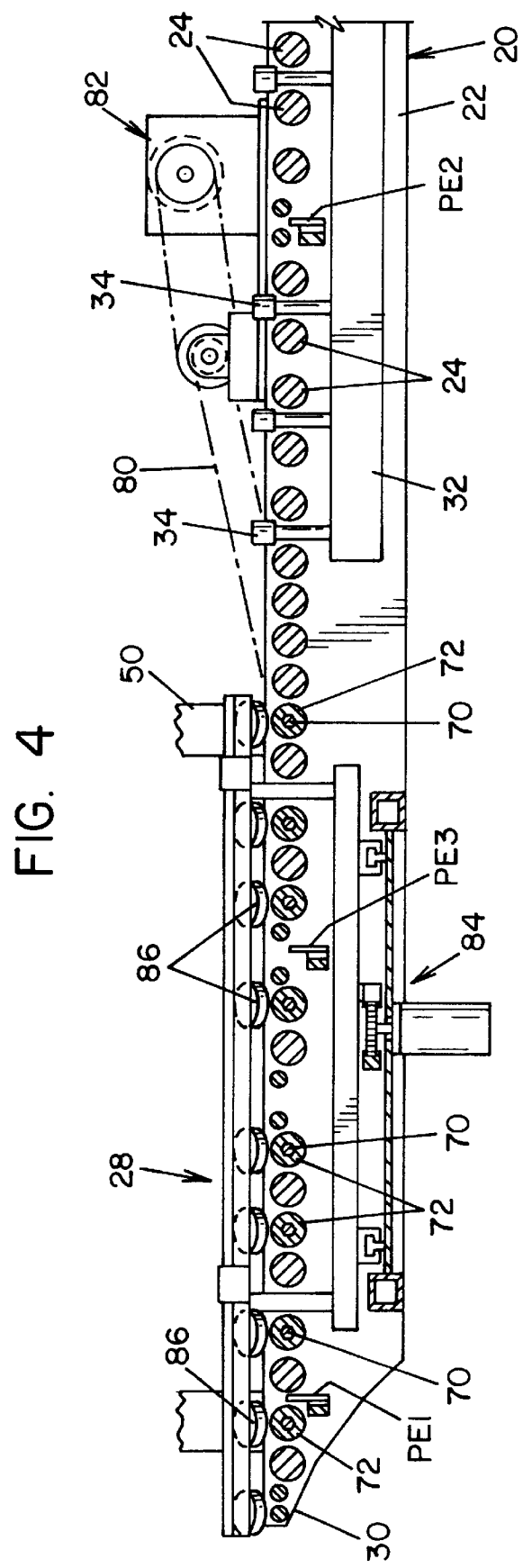
FIG. 4 is a side sectional view of the tread server taken along line 4—4 in FIG. 3.
Figure 5:
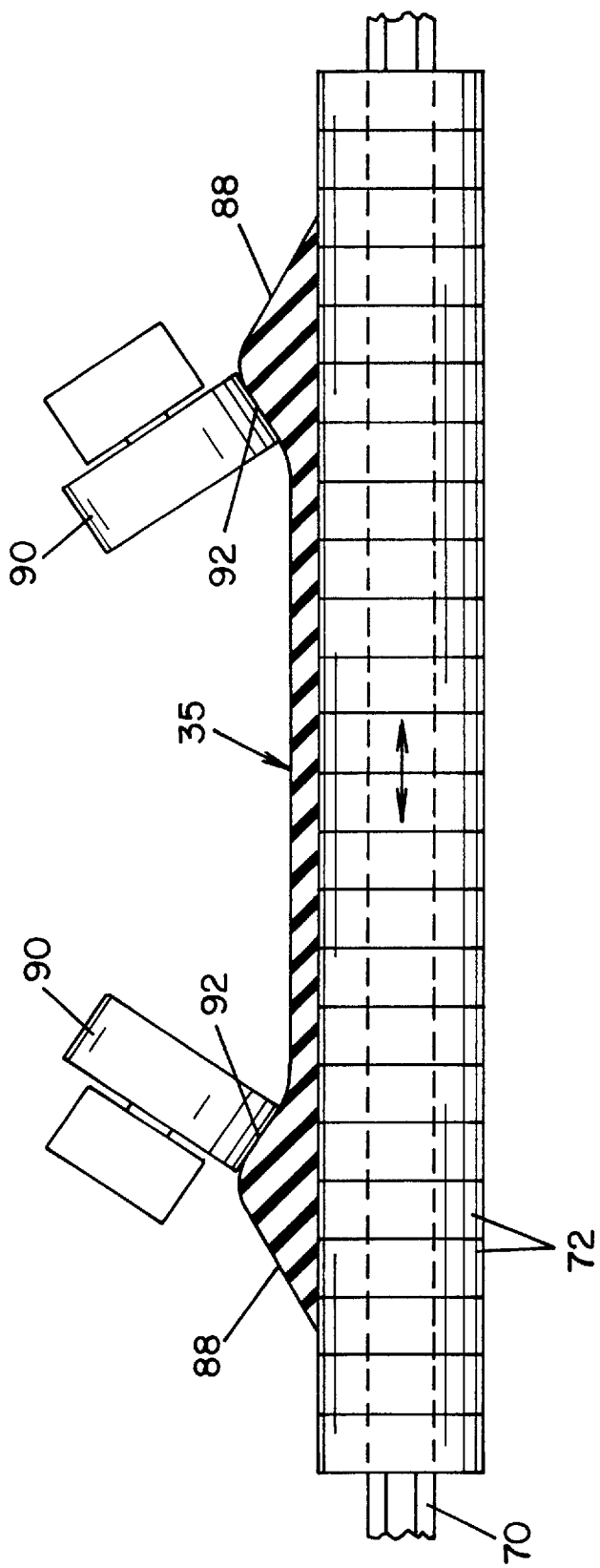
FIG. 5 is a fragmentary view like FIG. 2 of a modified guide roller arrangement.

Referring to FIGS 3 and 4, enlarged views of the tread server assembly 28 are shown incorporating a plurality of splined driven shafts 70 in side by side relation with rollers 72 having grooved cylindrical holes for sliding on the shafts. Springs 74 are disposed at the ends of the shaft s 70 in resilient engagement with the end rollers 72 to permit transverse movement of the tread 36 while at the same time driving the tread a predetermined distance. Each of the shafts 70 has a sprocket 78 driven by a chain 80 in driven relation with the drive assembly 82. An encoder may be driven by the drive assembly 82 to control the movement of the tread 35 through the tread server assembly 28. A centering mechanism 84 has a pinion and rack assembly for urging tilted guide rollers 86 into engagement with outer surface 88 of the raised shoulders of the tread 35. In a modification shown in FIG. 5 spring loaded guide rollers 90 are positioned inward from the raised shoulders of the tread 35 and mounted for engagement with inner surfaces 92 of the raised shoulders of the tread.

In order to determine the length and position of the tread 35 position, sensors such as photoeyes PE1, PE2 and PE3 are placed along the length of the tread server assembly 28. The first sensor such as photoeye PE1 is placed at a predetermined position close to the front end of the assembly as shown in FIGS. 3 and 4. The second sensor such as photoeye PE2 is placed a predetermined distance from PE1 in the retracted position of the tread server assembly 28. The third sensor such as photoeye PE3 is positioned at a predetermined position under the upper frame structure 50. A conveyor encoder is connected to the drive assembly 82 for measuring and determining the distance the tread 35 is moved by rotation of the driven rollers 72. An encoder E2 is connected to a shaft 94 of the drum 18 to determine the rotation and wrapped circumference of the drum during wrapping of the tread 35 around the drum.

Figure 6:
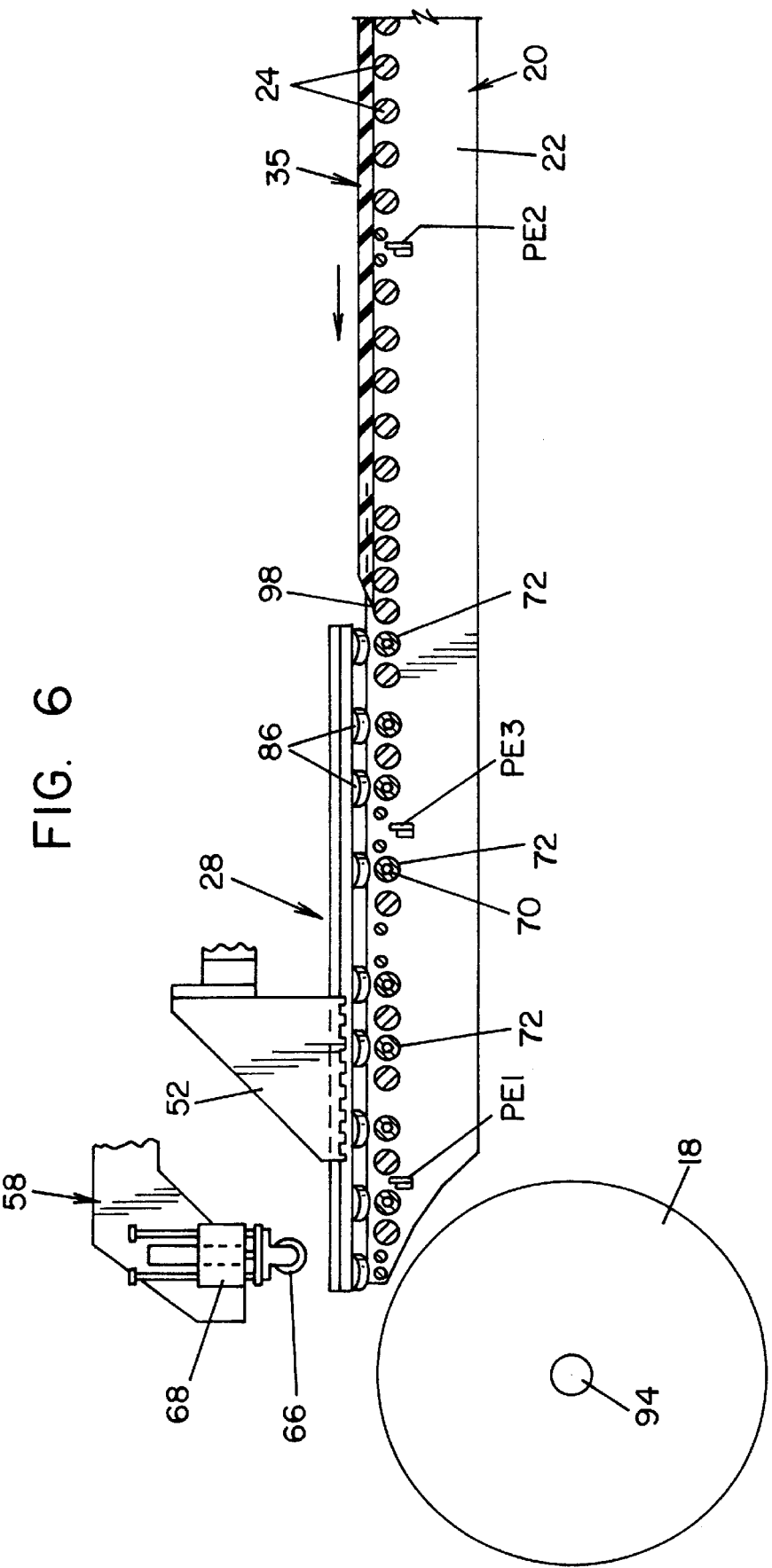
FIG. 6 is a diagrammatic view like FIG. 1 showing the tread server extended into position adjacent the drum and showing the tread just as it enters the position between the guide rollers.
Figure 7:
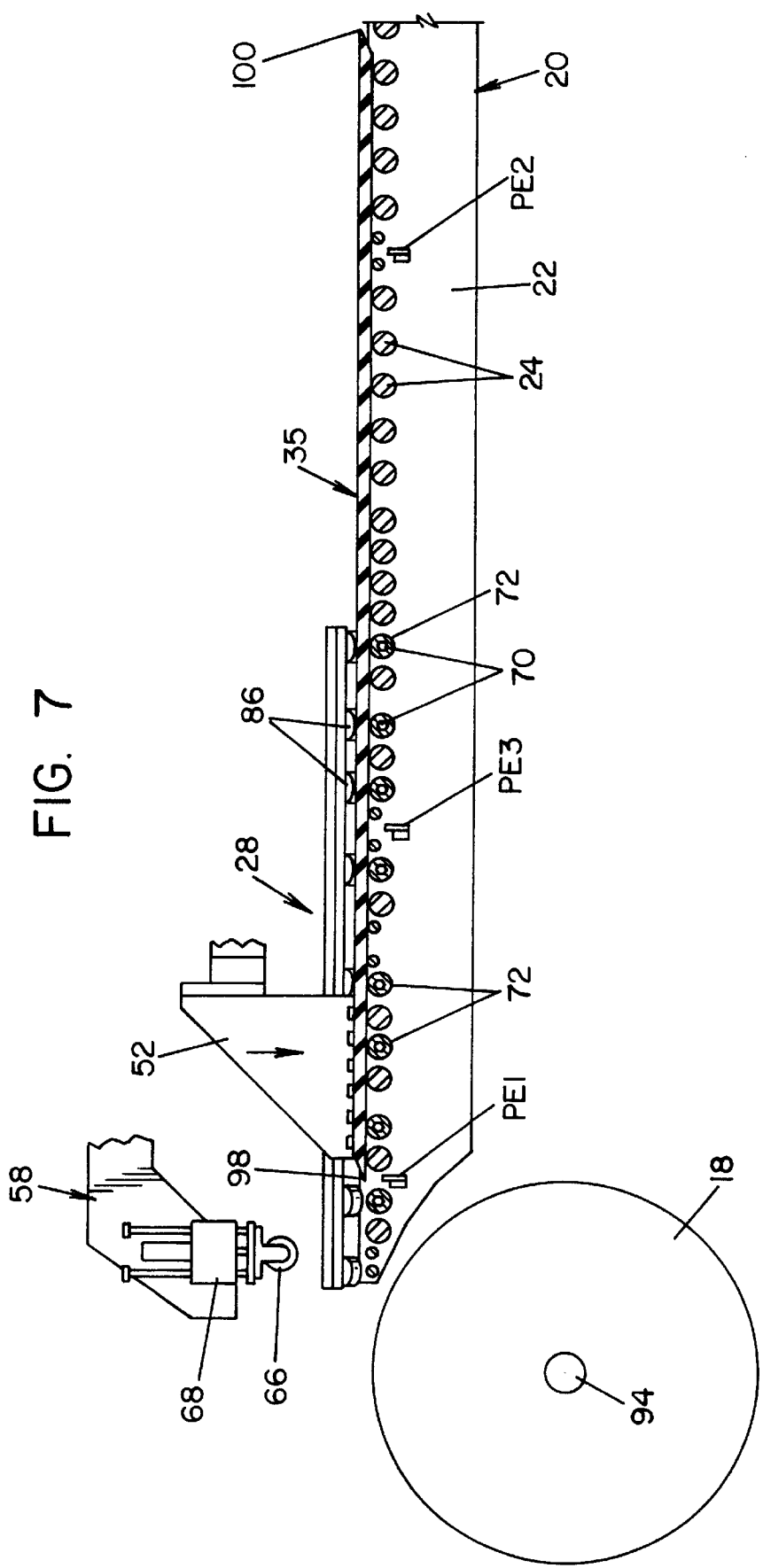
FIG. 7 is a view like FIG. 6 showing the tread with the leading edge at the first sensor and with the pricker bar gripper in engagement with the leading edge at the time the conveyor encoder is started to measure the length of the tread.
Figure 8:
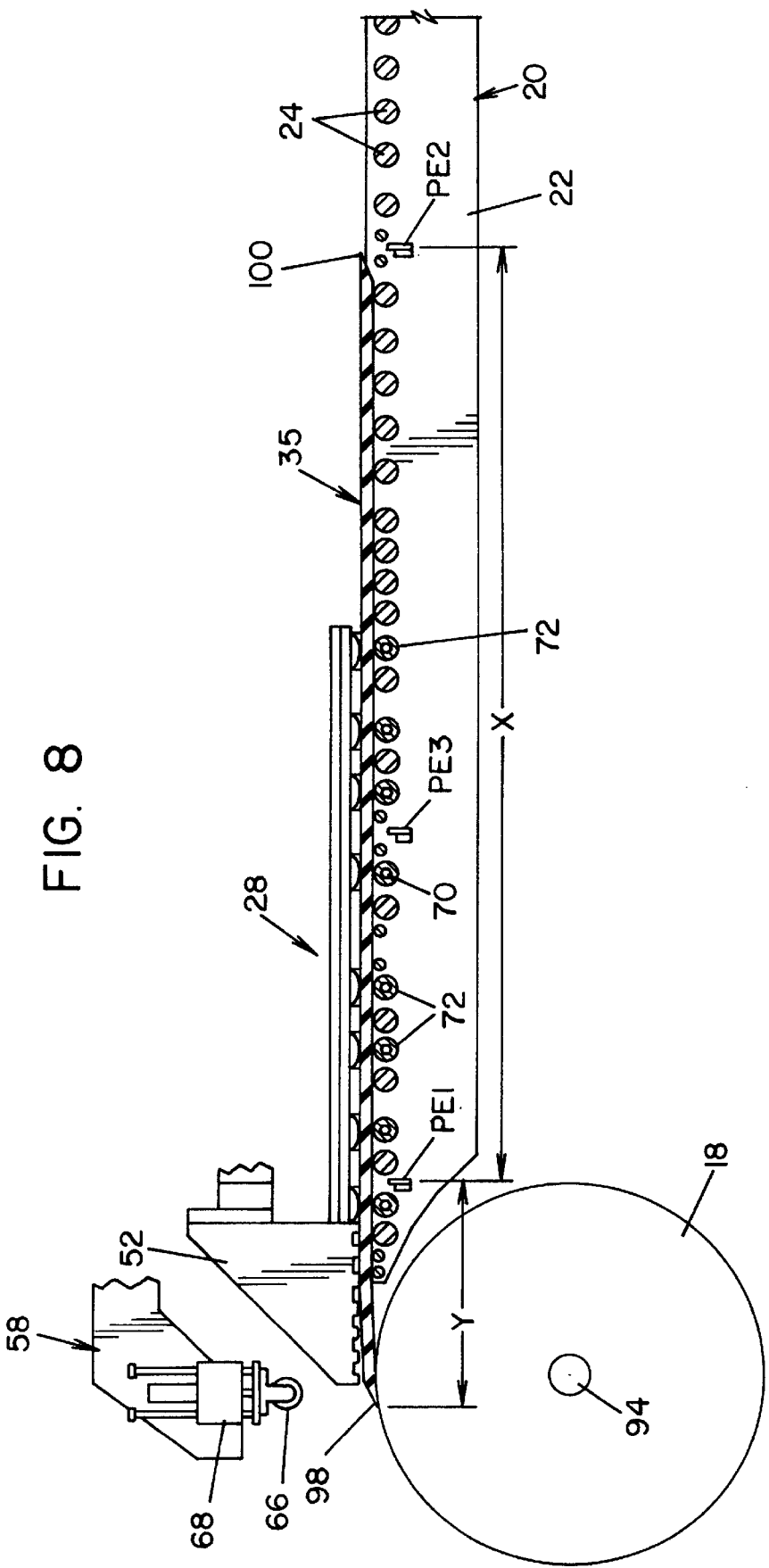
FIG. 8 is a view like FIG. 7 showing the pricker bar advancing the leading edge of the tread to the drum and a first tread measurement being made.

The operation of the tread server 10 embodying the invention is shown diagrammatically in FIGS. 6 through 10. After the belts (not shown) are wrapped around the drum 18 the tread server assembly 28 is moved by drive motor 42 from the retracted position shown in full lines to the extended position shown in dot dash lines in FIG. 1 and in FIGS. 6 through 10. The tread 35 is conveyed to the assembly 28 on rollers 24 as shown in FIG. 6. The leading edge 98 of the tread 35 is gripped by the rollers 72 at a position covering photoeye PE-3 and pulled toward the drum 18 between the tilted guide rollers 86. When the leading edge 98 passes over the photoeye PE-1 the pricker bars 52 are moved downwardly into engagement with the leading edge as shown in FIG. 7. The pricker bars 52 then move the tread 35 until a trailing edge 100 of the tread passes the photoeye PE2 as shown in FIG. 8. The distance X between photoeye PE1 and photoeye PE2 is equivalent to n encoder counts and is known. This distance is added to the distance Y in encoder counts between the photoeye PE1 and the position of the pricker bars 52 in FIG. 8 to determine the total initial length of the tread in encoder counts. The ratio of the initial length of the tread to the circumference of the drum 18 in encoder counts is then used to determine the ratio of the conveyor speed to the speed of rotation of the drum. For example if the initial measured tread length is less than the circumference of the drum 35 by more than the desired stretching of the tread by the driven rollers 72 and tilted guide rollers 86 the speed of rotation of the drum 18 is regulated so that it is greater than the conveyor speed.

Figure 9:
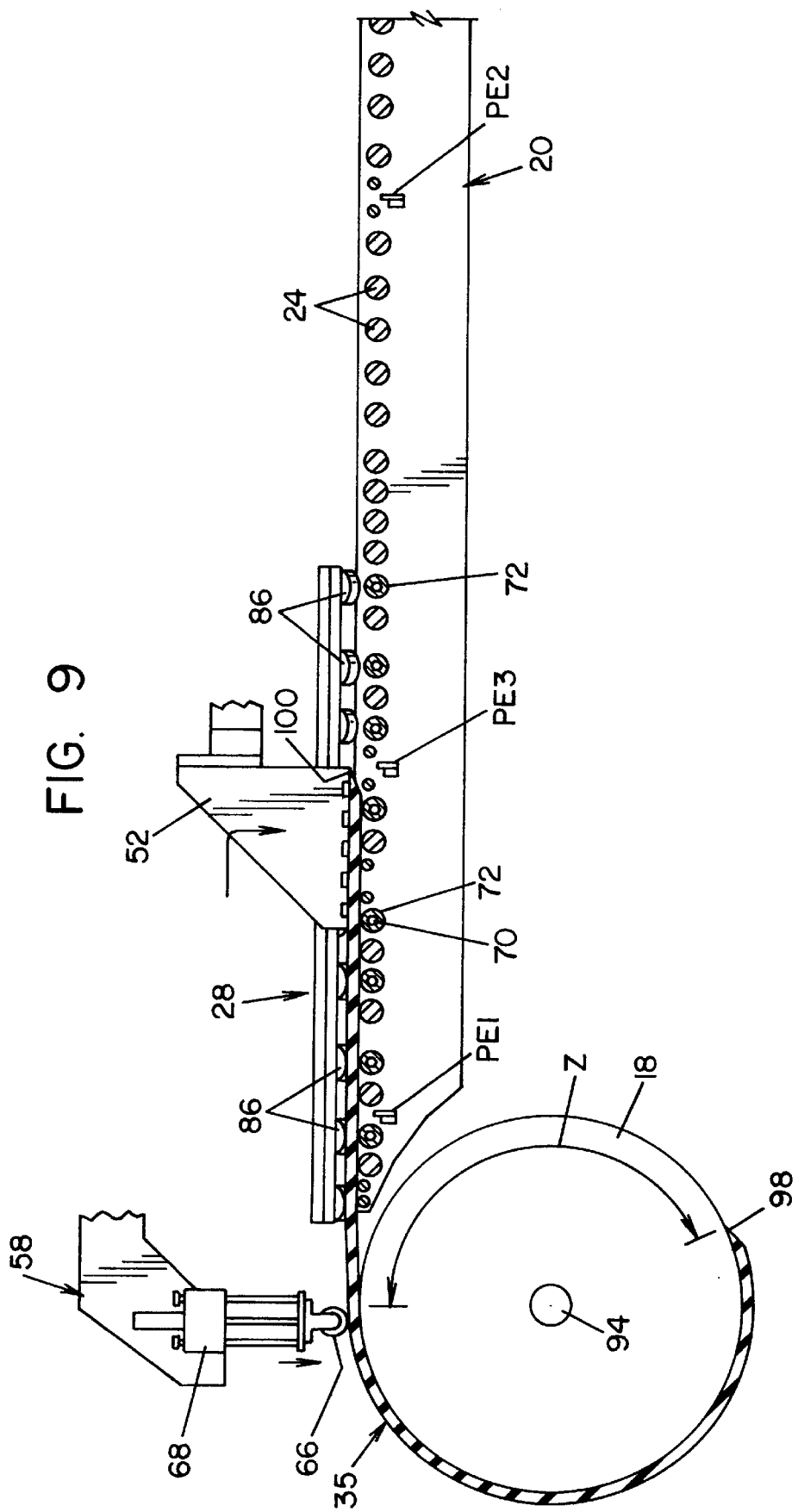
FIG. 9 is a view like FIG. 8 showing the tread partially wrapped around the drum and the pricker bar engaging the trailing edge of the tread with a second measurement of the length of the tread being made.
Figure 10:
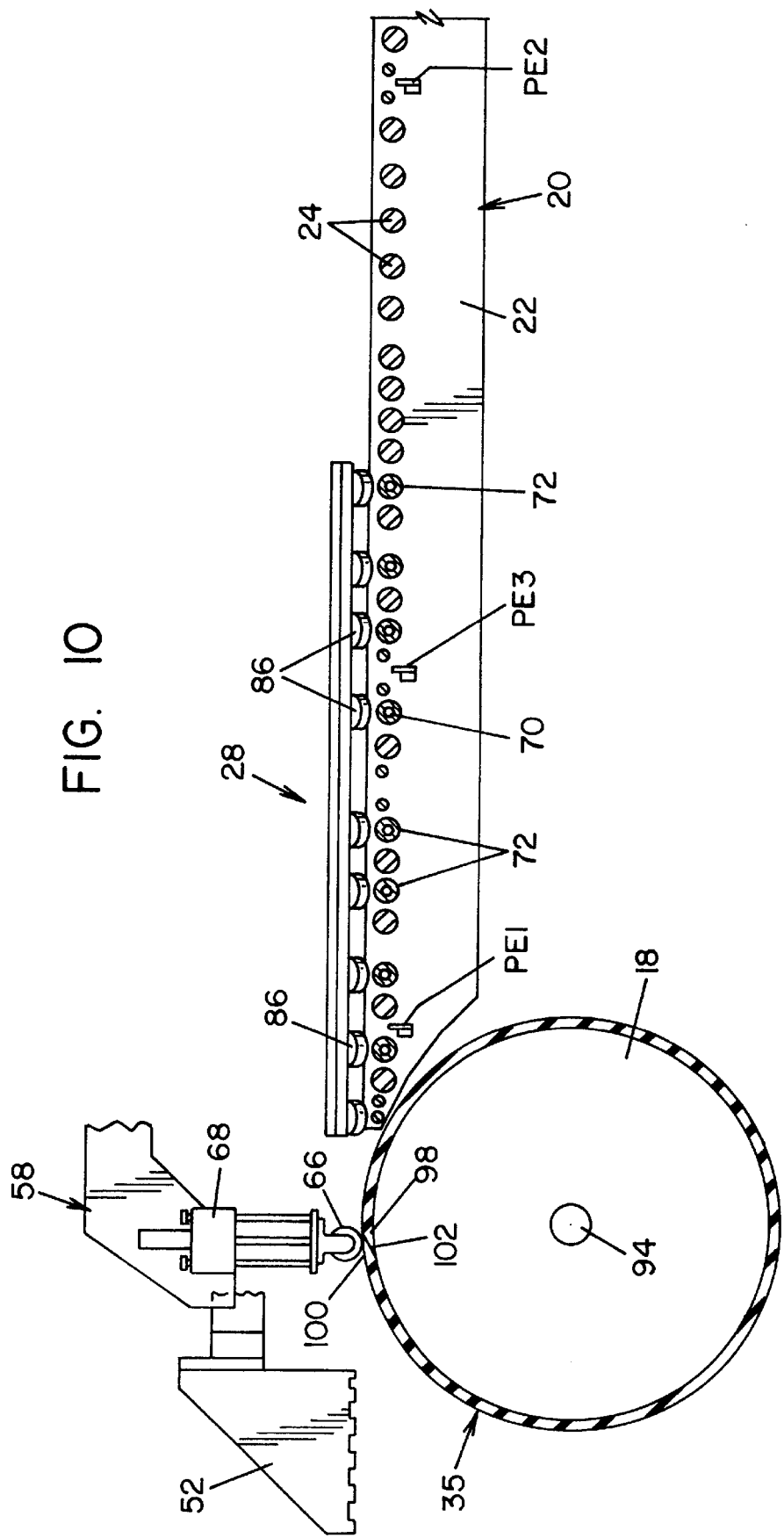
FIG. 10 is a view like FIG. 8 showing the trailing edge advanced by the pricker bar to the drum and an automatic splice being made.

A second measurement and adjustment of the tread application to the drum 18 is provided when the trailing edge 100 passes over the photoeye PE3 as shown in FIG. 9. The conveyor traveled "n actual" encoder counts to move the trailing edge 100 from photoeye PE2 to photoeye PE3. The length between photoeye PE2 and PE3 is "n" counts. Accordingly when there is controlled stretching of the tread it is shown by the difference between "n" and "n actual."

$$\text{The percent stretch} = \frac{n \text{ actual} - n}{n} \times 100\%.$$

With this information the initial ratio of conveyor speed to speed of rotation of the drum 18 can be decreased by the percent stretch. The method includes a second step of calculating a second ratio between the drum encoder count for the length z of the drum 18 not wrapped by the tread 35 as shown in FIG. 9 and the conveyor encoder count for the distance between photoeye PE3 and the end of the conveyor 20. The trailing edge 100 is gripped by the pricker bars 52 which are carried by the pricker bar frame 46 to a position over photoeye PE3 as shown in FIG. 9 and then to a position over the drum 18 where the trailing edge 100 is spliced to the leading edge 98 of the tread and pressed together at a splice 102 by a tack down roller 66 shown in FIG. 10.

The tread server assembly 28 may then be retracted and a transfer ring (not shown) of a tire building machine is utilized to transfer the belt and tread assembly to a tire carcass disposed on a tire shaping drum (not shown). A typical transfer apparatus is shown and described in U.S. Pat. No. 4,304,619 dated Dec. 8, 1981 which is incorporated by reference in this application.

After the belt and tread assembly is applied to the tire carcass the resulting tire will have a tire carcass with a pair of spaced apart beads connected by reinforcing plies, a belt member extending circumferentially around the tire carcass and a tread member 35 wrapped around the belt member. A tire of this construction is shown and described in U.S. Pat. No. 4,470,865 dated Sep. 11, 1984 which is incorporated by reference in this application.

While certain representative embodiments and details have been shown for the purpose of illustrating the invention, it will be apparent to those skilled in the art that various changes and modifications may be made therein without departing from the spirit or scope of the invention.

What is claimed is:

1. A method of transporting and guiding a tire tread on a conveyor having a plurality of rotatable driven rollers wherein said tire tread has raised shoulders with inner surfaces and said rotatable driven rollers are movable laterally comprising:

a. loading said tread on said conveyor;

b. rotating said driven rollers to transport said tread along said conveyor on said driven rollers; and, c. engaging said inner surfaces of said raised shoulders of said tread with guide rollers positioned at each side of said conveyor to exert centering pressure on said tread.

2. The method of claim 1 wherein said guide rollers are tilted to exert centering pressure on said shoulders in directions toward said inner surfaces of said raised shoulders of said tread.

3. The method of claim 2 further comprising exerting said centering pressure by said guide rollers when said tread is moved between said guide rollers.

* * * * *